(12) United States Patent
Sura et al.

(10) Patent No.: US 11,568,235 B2
(45) Date of Patent: Jan. 31, 2023

(54) DATA DRIVEN MIXED PRECISION LEARNING FOR NEURAL NETWORKS

(71) Applicant: INTERNATIONAL BUSINESS MACHINES CORPORATION, Armonk, NY (US)

(72) Inventors: Zehra Sura, Yorktown Heights, NY (US); Parijat Dube, Yorktown Heights, NY (US); Bishwaranjan Bhattacharjee, Yorktown Heights, NY (US); Tong Chen, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 947 days.

(21) Appl. No.: 16/194,791

(22) Filed: Nov. 19, 2018

(65) Prior Publication Data
US 2020/0160169 A1 May 21, 2020

(51) Int. Cl.
*G06N 3/08* (2006.01)
*G06N 3/04* (2006.01)

(52) U.S. Cl.
CPC .................. *G06N 3/08* (2013.01); *G06N 3/04* (2013.01)

(58) Field of Classification Search
CPC .......... G06N 3/08; G06N 3/04; G06N 3/0454; G06N 20/00; G06N 5/04; G06N 20/20; G06N 3/02; G06N 7/00; G06N 3/04554; G06N 3/06; G06F 9/30014; G06F 7/5324; G06F 9/30112; G06F 2111/10; G06F 16/27; G06K 9/6267; G06K 9/00288; G06K 9/00147; G06K 9/00087; G06K 9/00187

See application file for complete search history.

(56) References Cited

U.S. PATENT DOCUMENTS

| | | | |
|---|---|---|---|
| 8,560,639 B2 | 10/2013 | Murphy et al. | |
| 9,990,687 B1 | 6/2018 | Kaufhold et al. | |
| 2015/0019214 A1* | 1/2015 | Wang | G10L 15/34 704/232 |
| 2015/0324690 A1 | 11/2015 | Chilimbi et al. | |
| 2015/0378741 A1* | 12/2015 | Lukyanov | G06F 9/30014 712/226 |
| 2016/0358070 A1* | 12/2016 | Brothers | G06N 3/0454 |
| 2018/0240011 A1* | 8/2018 | Tan | G06N 3/063 |
| 2018/0262864 A1* | 9/2018 | Reynolds | G06F 21/6245 |
| 2018/0307494 A1* | 10/2018 | Ould-Ahmed-Vall | G06T 1/20 |
| 2018/0315398 A1* | 11/2018 | Kaul | G06F 9/30014 |

(Continued)

OTHER PUBLICATIONS

Ho et al. Exploiting half precision arithmetic in Nvidia GPUs (2017) (Year: 2017).*

(Continued)

*Primary Examiner* — Ying Yu Chen
*Assistant Examiner* — Brian J Hales
(74) *Attorney, Agent, or Firm* — Griffiths & Seaton PLLC

(57) ABSTRACT

Embodiments for implementing mixed precision learning for neural networks by a processor. A neural network may be replicated into a plurality of replicated instances and each of the plurality of replicated instances differ in precision used for representing and determining parameters of the neural network. Data instances may be routed to one or more of the plurality of replicated instances for processing according to a data pre-processing operation.

18 Claims, 6 Drawing Sheets

(56) References Cited

U.S. PATENT DOCUMENTS

2020/0012917 A1* 1/2020 Pham ............... G06N 20/20
2020/0134461 A1* 4/2020 Chai ............... G06N 3/088

OTHER PUBLICATIONS

"Machine Learning to Select Best Network Access Point" Anonymously; IP.com Electronic Publication Date: Dec. 15, 2017, (35 Pages).

"Ranking and automatic selection of machine learning models" Authors et. al.: Disclosed Anonymously IP.com No. IPCOM000252275D IP.com Electronic Publication Date: Jan. 3, 2018 (34 Pages).

"Mixed Precision Training of Convolutional Neural Networks Using Integer Operations" Dipankar Das, Naveen Mellempudi, Dheevatsa Mudigere, Dhiraj Kalamkar et al. Feb. 2018.

* cited by examiner

DATA DRIVEN MIXED PRECISION LEARNING FOR NEURAL NETWORKS

BACKGROUND OF THE INVENTION

Field of the Invention

The present invention relates in general to computing systems, and more particularly to, various embodiments for data driven mixed precision learning for neural networks by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence that is employed to allow computers to evolve behaviors based on empirical data.

SUMMARY OF THE INVENTION

Various embodiments for implementing data driven mixed precision learning for neural networks by a processor, are provided. In one embodiment, by way of example only, a method for implementing mixed precision learning for neural networks for deep learning problems, again by a processor, is provided. A neural network may be replicated into a plurality of replicated instances and each of the plurality of replicated instances differ in precision used for representing and determining parameters of the neural network. Data instances may be routed to one or more of the plurality of replicated instances for processing according to a data pre-processing operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
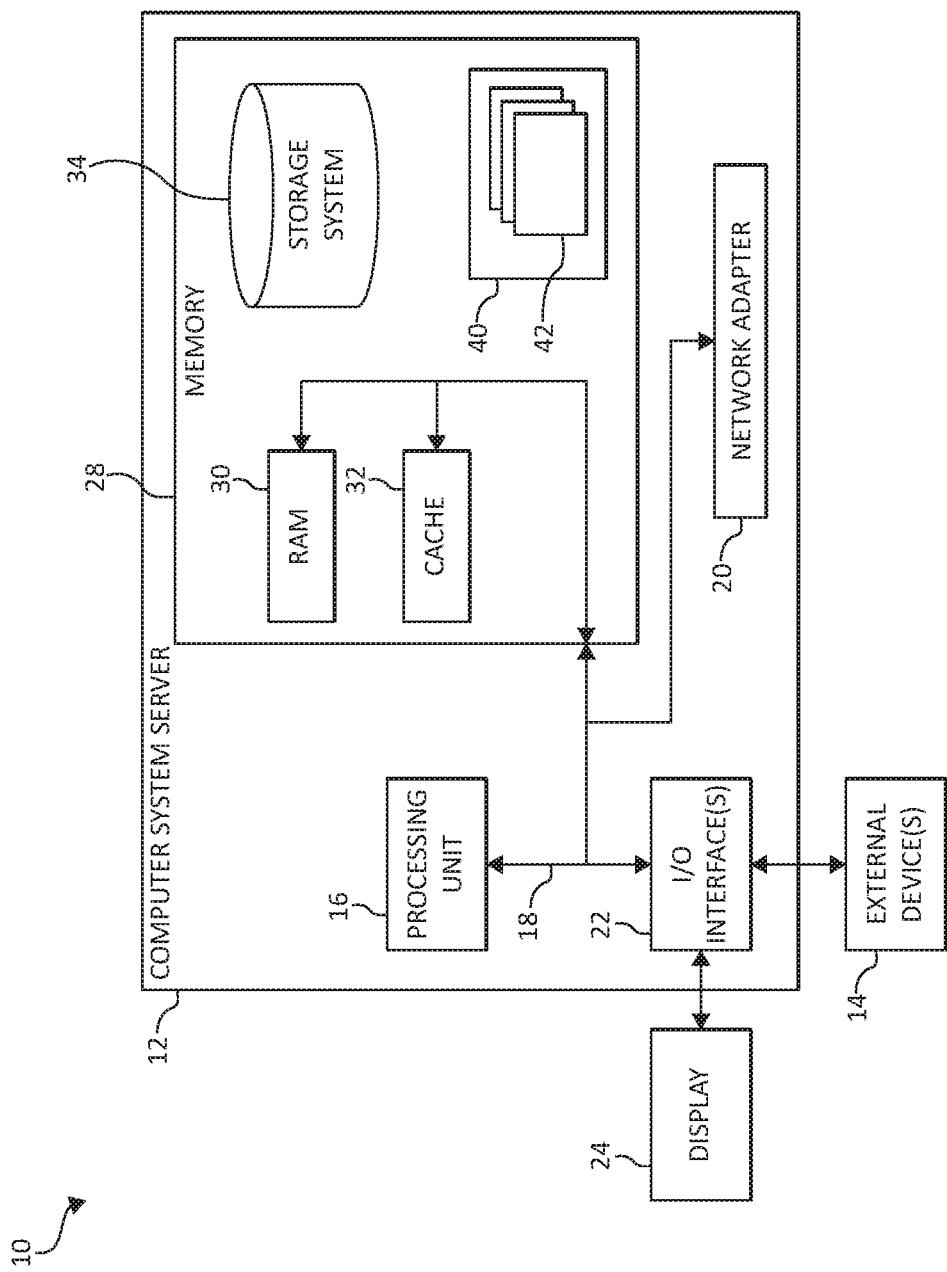
FIG. 1 is a block diagram depicting an exemplary cloud computing node according to an embodiment of the present invention.

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

In machine learning and cognitive science, neural networks are a family of statistical learning models inspired by the biological neural networks of animals, and in particular the brain. Neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of desired patterns, such as images and characters. Oftentimes, these neurons are grouped into "layers" in order to make connections between groups more obvious and to each computation of values. Training the neural network is a computationally intense process. For example, designing machine learning (ML) models, particularly neural networks for deep learning, is a trial-and-error process, and typically the machine learning model is a black box.

Furthermore, training and using neural networks for deep learning problems is time consuming and requires extensive use of compute resources. Further, designing and tuning neural networks is an iterative process based on trial-and-error, which makes it even more imperative to speed up training.

Reduced precision computing is computing using a fewer number of digits to represent the numeric values in the computation. In one aspect, reduced precision computing may be used to increase the efficiency of training or inference using neural networks such as, for example, increasing efficiency in time, power/energy consumption, and/or memory requirements. Various computing hardware and applications, supporting multiple precisions, and libraries supporting flexible numerical formats, may enable the use of reduced precision computing in neural networks. In addition to reduced precision, mixed precision computing may also be used to increase the efficiency of training or inference using neural networks. Mixed precision computing is computing where certain operations (e.g., the multiplication operations) are performed in reduced precision using a fewer number of digits to represent numeric values in the computation, and other operations (e.g., accumulation) are performed in higher precision using more digits to represent numeric values in the computation. This is primarily done to counter the possible negative effect of reduced precision, or in other words, loss of precision leading to reduced accuracy of trained neural networks.

Said differently, reduced precision may lead to a loss in accuracy and current approaches to overcome this loss include using mixed precision (different precisions for different operations or functions in the overall neural network), finessing a design of the neural network, or reverting to computations using the original precision. Computing platforms may support multiple precisions, with lower precision computations being more efficient than higher precision computations. In one aspect, reduced or mixed precision may be used in an identical manner for processing each input data instance. However, such an approach can be either inefficient or have an adverse effect on the accuracy of the trained model because precision is not customized based on contents of the data instance and domain knowledge of the learning problem.

Accordingly, the present invention provides a solution for data driven mixed precision learning for neural networks. In one aspect, the present invention builds neural networks to exploit reduced precision computing. An original neural network may be replicated, with the neural network replica instances differing from each other in the precision used for representing and computing the parameters of the network. For example, one neural network replica instance may use 8-bits to represent each numerical value in the neural network whereas a second neural network replica instance may use 16-bits to represent each numerical value in the neural network. A pre-processing step operation may be added for the input data, where the content of the input data is analyzed. Based on the content of the data and the context of the learning problem, the pre-processing operation determines a best precision to be used for processing each data instance. This determination is then used to route input data instances to appropriate replicas of the neural network for processing.

In one aspect, the present invention provides a solution for data driven mixed precision learning for neural networks by building neural networks to exploit reduced precision computing where the original neural network is replicated, with the replicas differing from each other in the precision used for representing and computing the parameters of the network, and a data pre-processing step is used to route input data instances to appropriate replicas for processing. The number of replicas to create may be determined based on the levels of precision and numerical formats supported by the targeted computing platform. The replicas can differ in batch size or number of learners used. A data pre-processing operation can use known metrics, or a trained neural network, to determine the best level of precision for each input data instance. For example, when the learning problem uses images as input data, metrics such as smoothness or compressibility of the image may be used in the data pre-processing operation. The routing of data to appropriate neural network replicas can be determined statically based on the results of the pre-processing step, or dynamically by also taking into account instantaneous processing load at each replica. For inference, the trained neural network replicas can be combined into fewer neural networks. The combination of neural network replicas is based on a weighted combination of parameters from the replicas being merged, where the weighting may depend on the number of input data instances processed through the individual replicas. Batches can be statically or dynamically formed, and batches can be homogeneous or heterogeneous in the precision levels of data instances in the batch. For heterogeneous batches, the choice of neural network replica to use can be based on the maximum precision level for any data instance in the batch, or it can be based on the precision level that occurs most often in the batch.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
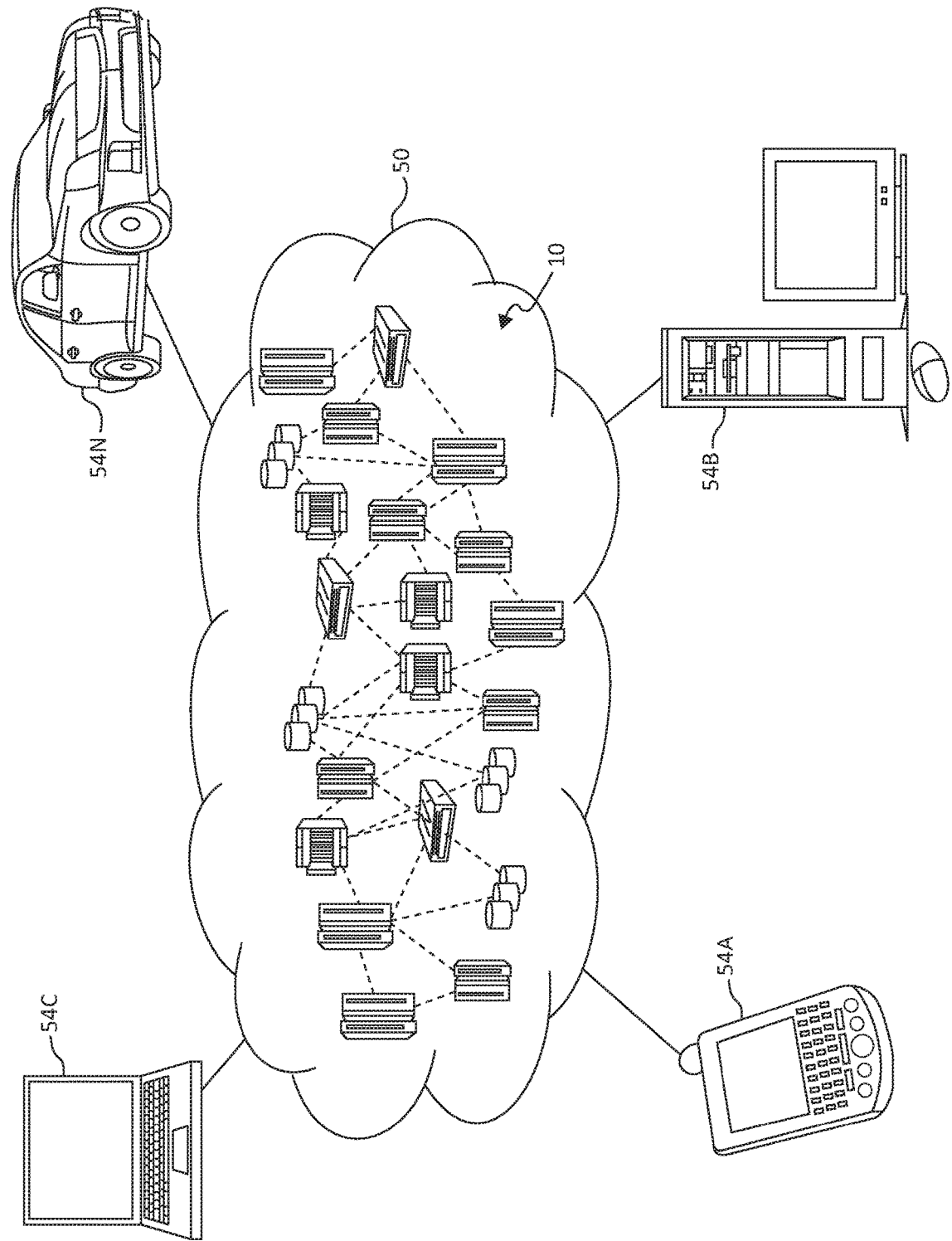
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
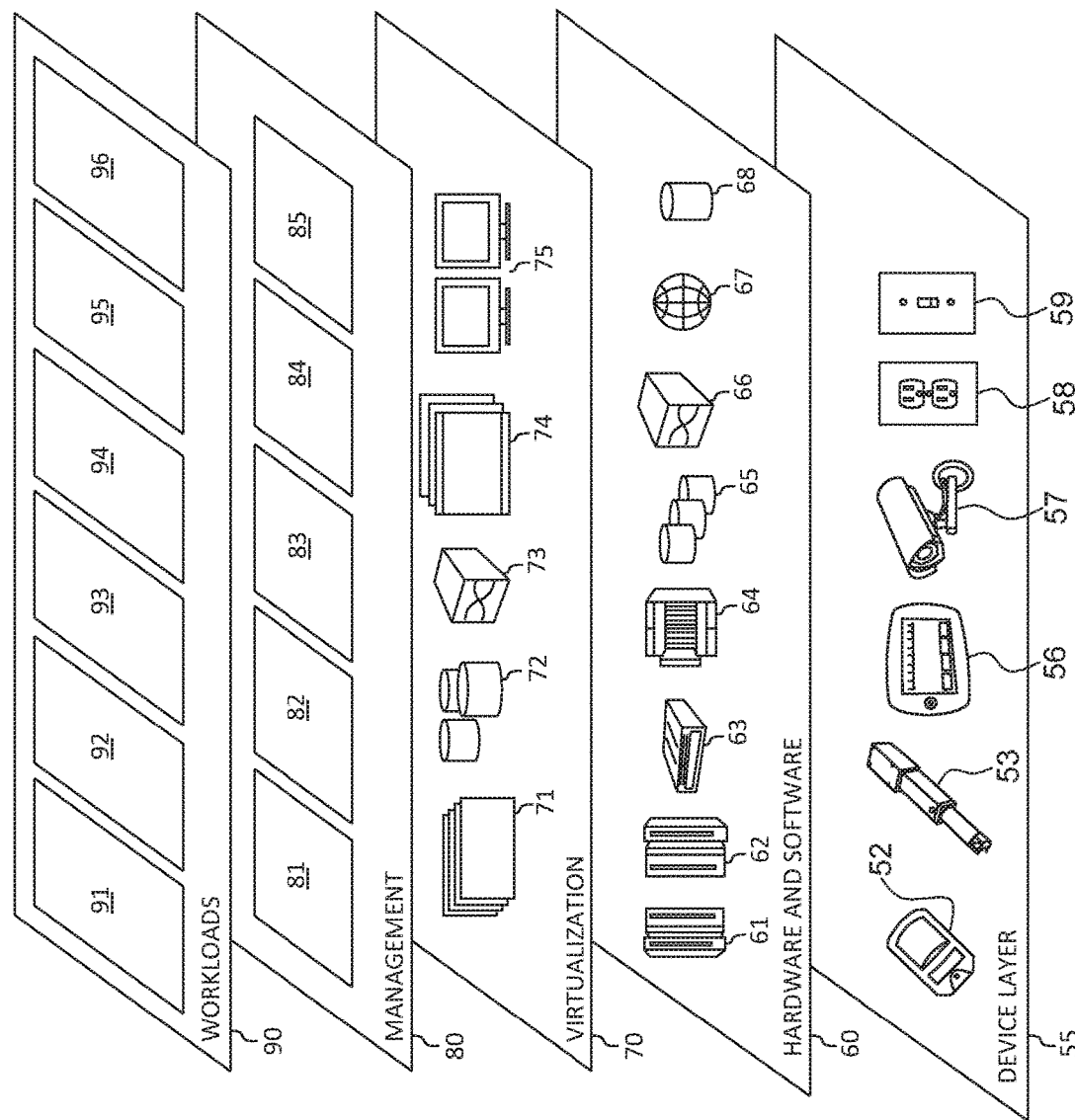
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for data driven mixed precision learning for neural networks. In addition, workloads and functions 96 for data driven mixed precision learning for neural networks may include such operations as data analytics, data analysis, and as will be further described, notification functionality. One of ordinary skill in the art will appreciate that the workloads and functions 96 for data driven mixed precision learning for neural networks may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for data driven mixed precision learning for neural networks. One or more data instances may be analyzed during a data pre-processing operation. A required precision level to use for processing the one or more data instances is determined during the data pre-processing operation. A neural network may be replicated into a plurality of replicated instances and each of the plurality of replicated instances differ in precision used for representing and determining parameters of the neural network. Data instances may be routed to one or more of the plurality of replicated instances for processing according to a data pre-processing operation.

It should be noted that a required precision level may be non-uniform for all instances of input data in a particular problem domain. For example, when using images as input data, images of open landscape or scenic vistas have very different properties for the purpose of learning, as compared to images of one or more specific objects. In some instances, lower precision may negatively impact accuracy, but in other instances, lower precision can facilitate increased learning. Thus, the relationship between precision used in learning and accuracy of the trained models is unpredictable. However, knowing the context of the learning problem and the contents of the input data, statistical metrics can be devised to determine the precision level that best fits the data instance for the purpose of learning from the context.

As an example, consider the learning problem of image classification. A possible metric may be a weighted combination of: 1) a measure of repetitiveness in the image (which can be approximated by the percentage compression ratio that can be achieved using a standard algorithm or compression utility), and/or 2) a measure of smoothness in the image (which can be approximated by computing, for each image point, the sum of distances (differences) of that point and all its neighbors and then taking the mean and standard deviation of the computed values for all points in the image).

A neural network can be trained to determine the precision level that best fits each input data instance. In an additional aspect, the pre-processing operation may use pre-defined metrics. The present invention works by replicating an original neural network, with the replicas differing from each other in the precision used for representing and computing the parameters of the network. The number of replicas may depend on the different precisions/numerical formats efficiently supported by the computing platform. For each replica instance, the number of learners or batch size supported by the replica may also differ depending on available hardware resources or application requirements. For each input data instance, a best level of precision to use for the input data is determined during pre-processing based on the content of the data and the context of the learning problem. The analytics of the pre-processing operation may then be used to route the input data to one or more of the neural network replicas for processing. The neural network replica that uses the same/similar level of precision may be selected/chosen, or if such a replica does not exist, then the replica supporting a next higher level of precision may be selected/chosen. Optionally, the routing of input data instances to a neural network replica can be dynamically determined, based on instantaneous processing load of each replica.

During training, each replica of the neural network may be independently trained using a subset of the training input data and the training process may be constrained to use a minimum percentage of data in the training dataset for training of each of the neural network replica instances. After training, when the neural networks are to be used for inference, the application may use the same set of replicas as in the training step. Alternatively, inference may use a computing platform that supports different precision levels, and therefore it may use only a subset of the replicas that were trained. Since the replicated copies of the neural network have the same structure, they can be combined into fewer neural networks if needed, using weighted combinations of parameters from the individual replicas being merged. The weighting can depend on the number of input data instances processed through a given replica during training.

Since training and inference may be performed on batches of input data, the present invention may determine which neural network replica to use based on properties of individual input data instances. Therefore, when forming batches, properties of each data instance within a batch may be considered. Batches can be created statically or dynamically. Further, batches may be constrained to contain data instances with the same precision level as a best fit for each instance in the batch (e.g., homogeneous batches). Alternatively, batches may contain data instances with varying precision levels for the best fit (heterogeneous batches). For heterogeneous batches, the choice of neural network replica to use can be based on the maximum precision level for any data instance in the batch, or it can be based on the precision level that occurs most often in the batch.

Figure 4:
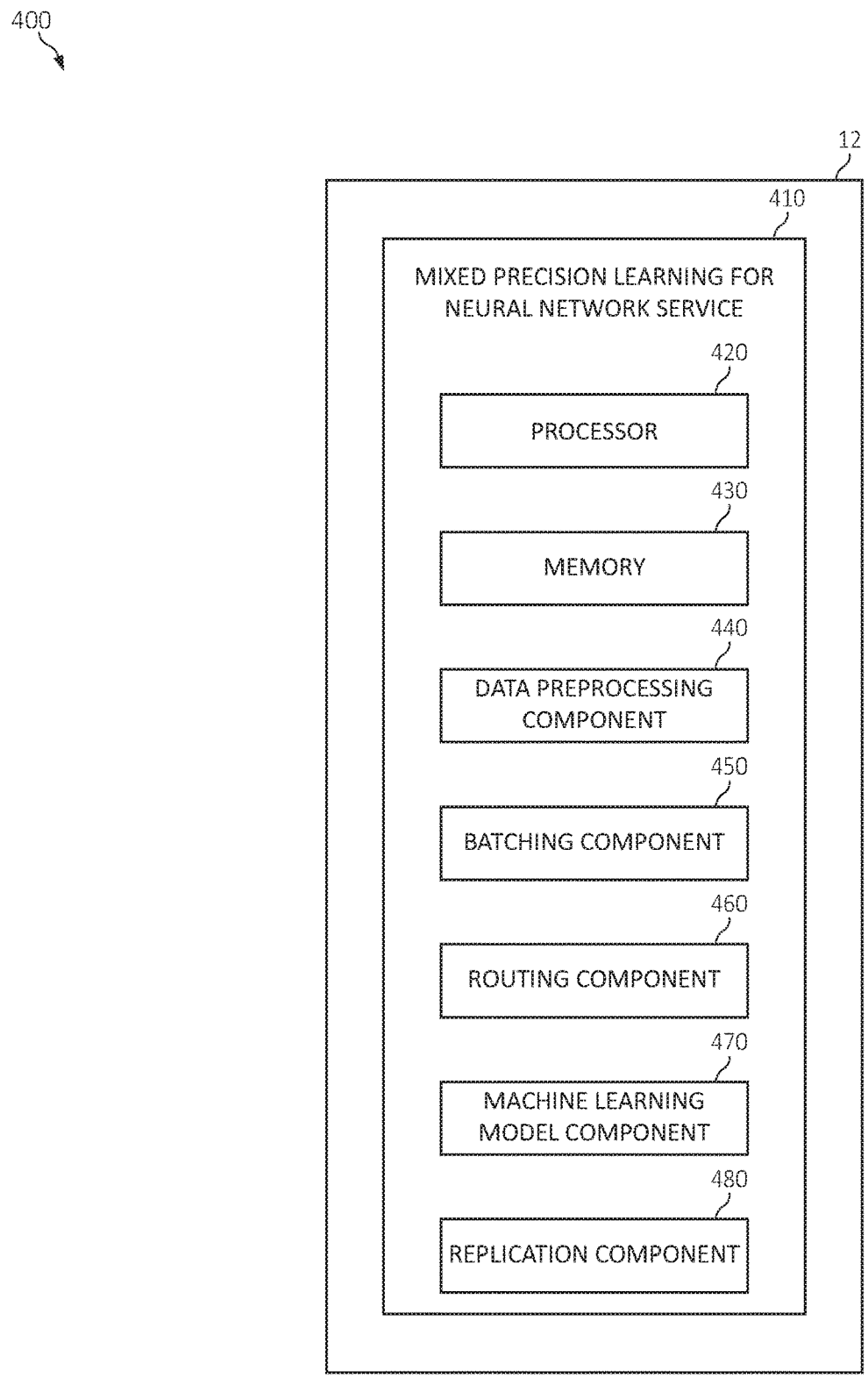
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A mixed precision learning for neural network service 410 is shown, incorporating processing unit ("processor") 420 to perform various computational, data processing and other functionality in accordance with various aspects of the present invention. The mixed precision learning for neural network service 410 may be provided by the computer system/server 12 of FIG. 1. The processing unit 420 may be in communication with memory 430. The mixed precision learning for neural network service 410 may include a data pre-processing component 440, a batching component 450, a routing component 460, a machine learning model component 470, and a replication component 480.

As one of ordinary skill in the art will appreciate, the depiction of the various functional units in mixed precision learning for neural network service 410 is for purposes of illustration, as the functional units may be located within the mixed precision learning for neural network service 410 or elsewhere within and/or between distributed computing components.

In one embodiment, by way of example only, the mixed precision learning for neural network service 410 may modularly construct a neural network for deep learning problem. More specifically, the mixed precision learning for neural network service 410, using the replication component 480, may replicate a neural network into a plurality of replicated instances. Each of the plurality of replicated instances differ in precision used for representing and determining parameters of the neural network. The replication component 480 may determine a number of replicated instances to replicate from the neural network based on precision levels and numerical formats supported by a computing platform.

A data pre-processing component 440 may determine a required precision level to use for processing the one or more data instances during the data pre-processing operation. The data pre-processing component 440 may analyze the one or more data instances based on data content and a context of a deep learning problem during the data pre-processing operation and use one or more known metrics or a trained neural network to determine a precision level during the data pre-processing operation.

The batching component 450 may batch the one or more data instances according to a homogeneous precision levels or heterogeneous precision levels. Batches can be statically or dynamically formed, and batches can be homogeneous (e.g., similar) or heterogeneous (e.g., different). For heterogeneous batches, the choice/selection of one of the replicated neural network instances to use may be based on a maximum precision level for any data instance in the batch, or it may be based on a precision level that occurs most often in the batch.

The routing component 460 may route data instances to one or more of the plurality of replicated instances for processing according to a data pre-processing operation. That is, the routing component 460 may select data instances for routing to one or more of the plurality of replicated instances according to a required precision level, a dynamic load, or combination thereof.

The machine learning component 470, in association with the replication component 480, may independently train each replicated instance (e.g., replicated neural network instance) and may combine one or more of the replicated instances that are trained based on a weighted combination of parameters from the one or more of the plurality of replicated instances being combined.

By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
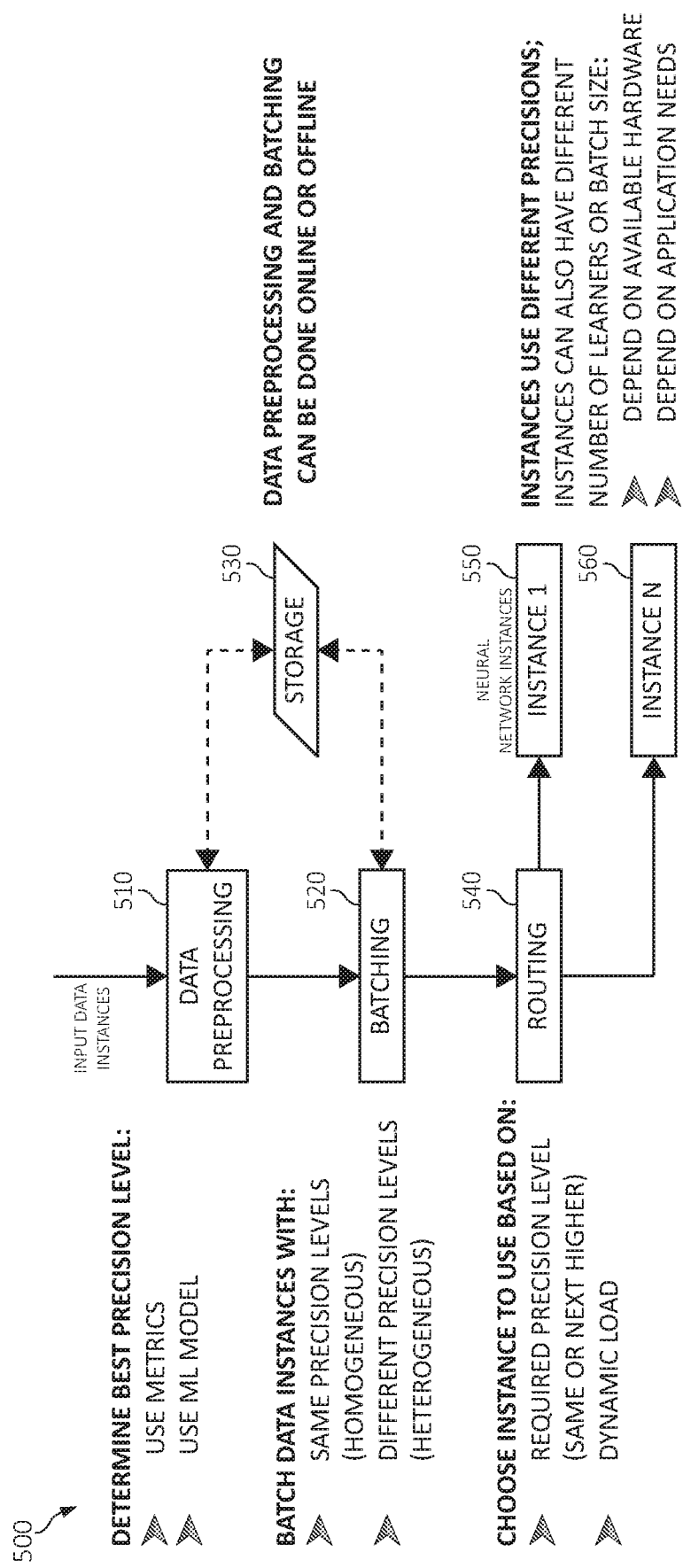
FIG. 5 is a flowchart diagram depicting an exemplary method for implementing mixed precision learning for neural networks in which various aspects of the present invention may be realized.

Turning now to FIG. 5, flowchart diagram 500 depicts an exemplary method for implementing mixed precision learning for neural networks for deep learning, again in which various aspects of the present invention may be realized. The functionality 500 may be implemented as a method executed as instructions on a machine, where the instructions are included on at least one computer readable medium or one non-transitory machine-readable storage medium.

One or more data instances may be received and analyzed during a data pre-processing operation, as in block 510. The data pre-processing operation may include determining a best precision level using metrics and/or a machine learning model.

A batching operation may be performed upon completion of the data pre-processing operation, as in block 520. That is, the data instances may be batched according to homogeneous precision levels (e.g., same/similar precision levels) or heterogeneous precision levels (e.g., different precisions levels). In one aspect, the data pre-processing operation and batching operation may be performed online and/or offline (and stored "storage"), as indicated in block 530.

A neural network may be replicated into a plurality of replicated instances and each of the plurality of replicated instances differ in precision used for representing and determining parameters of the neural network and data instances may be routed to one or more of the plurality of replicated instances such as, for example replicated instance 1 550 and/or replicated instance N 560, for processing according to a data pre-processing operation, as in block 540. Each data instance may be selected based on 1) a required precision level (e.g., same/similar precision level or higher), and/or 2) a dynamic load. Also, each replicated instance may differ in precision level. The replicated instances such as, for example, replicated instance 1 550 and/or replicated instance N 560, may also have a different number of learners and/or batch size depending on 1) available computing hardware/components, and/or 2) application needs.

Figure 6:
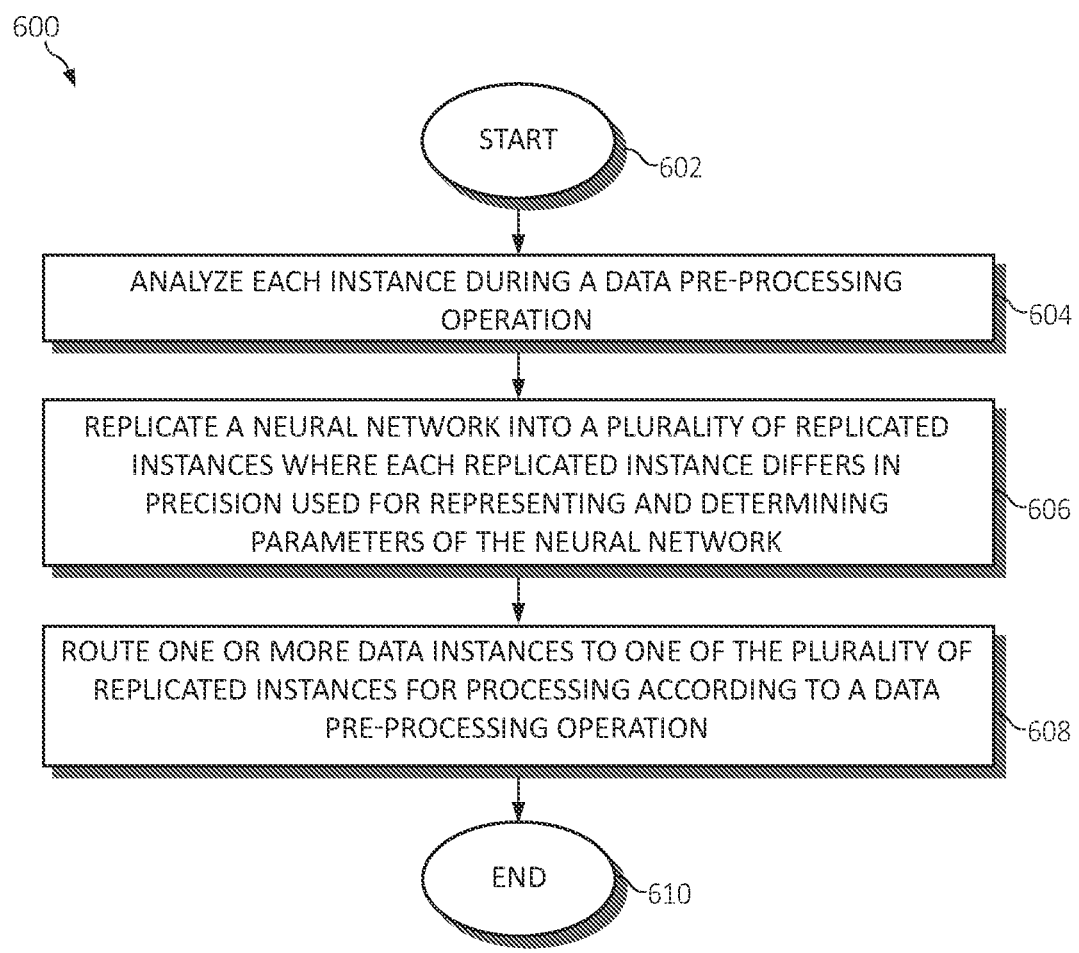
FIG. 6 is an additional flowchart diagram depicting an exemplary method for implementing mixed precision learning for neural networks, again in which various aspects of the present invention may be realized.

FIG. 6 is an additional flowchart diagram 600 depicting an additional exemplary method for implementing mixed precision learning for neural networks, again in which various aspects of the present invention may be realized. The functionality 600 may be implemented as a method executed as instructions on a machine, where the instructions are included on at least one computer readable medium or one non-transitory machine-readable storage medium. The functionality 600 may start in block 602.

One or more data instances may be analyzed during a data pre-processing operation, as in block 604. A neural network may be replicated into a plurality of replicated instances and each of the plurality of replicated instances differ in precision used for representing and determining parameters of the neural network, as in block 606. Data instances may be routed to one or more of the plurality of replicated instances for processing according to a data pre-processing operation, as in block 608. The functionality 600 may end, as in block 610.

In one aspect, in conjunction with and/or as part of at least one block of FIG. 6, the operations of method 600 may include each of the following. The operations of method 600 may determine a required precision level to use for processing the one or more data instances during the data pre-processing operation, analyze the one or more data instances based on data content and a context of a deep learning problem during the data pre-processing operation, and/or use one or more known metrics or a trained neural network to determine a precision level during the data pre-processing operation.

The operations of method 600 may select the data instances for routing to the one or more of the plurality of replicated instances according to a required precision level, a dynamic load, or combination thereof.

The operations of method 600 may batch the one or more data instances according to a homogeneous precision levels or heterogeneous precision levels. For heterogeneous batches, the choice of neural network instance to select/use can be based on a maximum or mode of precision levels in the batch. The operations of method 600 may determine a number of the plurality of replicated instances based on precision levels and numerical formats supported by a computing platform. Also, each of the replicated instances may be independently trained and may be combined based on a weighted combination of parameters from the one or more of the plurality of replicated instances being combined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing mixed precision learning for neural networks by a processor, comprising:
   replicating a neural network into a plurality of replicated instances, wherein each of the plurality of replicated instances differs in precision used for representing and determining parameters of the neural network;
   receiving data instances as input,
   performing a data pre-processing operation on the data instances prior to routing the data instances to one or more of the plurality of replicated instances of the neural network, wherein the data pre-processing operation analyzes content of the data instances to determine a context of a type of deep learning problem associated with the content;
   determining, based on the data pre-processing operation, a required precision level to use to process each data instance, wherein the required precision level is a most optimal precision level at which the content of each data instance is most optimally processed with respect to a performance of the neural network;
   determining whether a particular replicated instance operating at the required precision level exists for a particular data instance of the data instances, wherein the particular replicated instance operating at the required precision level does not exist for a particular data instance of the data instances when none of the plurality of replicated instances operates at the most optimal precision level for processing the content of the particular data instance;
   responsive to determining the required precision level, routing the data instances to the one or more of the plurality of replicated instances for processing according to the required precision level to use to process each data instance, wherein each data instance is routed to a particular replicated instance of the one or more of the plurality of replicated instances operating at the required precision level; and
   responsive to determining the particular replicated instance operating at the required precision level does not exist for a particular data instance of the data instances in that none of the plurality of replicated instances operates at the most optimal precision level for processing the content of the particular data instance, routing the particular data instance to one of the one or more of the plurality of replicated instances operating at a higher precision level than the required precision level.

2. The method of claim 1, further including
   using one or more known metrics or a trained neural network to determine the required precision level comprising the most optimal precision level during the data pre-processing operation.

3. The method of claim 1, further including selecting the data instances for routing to the one or more of the plurality of replicated instances according to the required precision level, a dynamic load, or combination thereof.

4. The method of claim 1, further including batching the data instances according to homogeneous precision levels or heterogeneous precision levels.

5. The method of claim 1, further including determining a number of the plurality of replicated instances based on precision levels and numerical formats supported by a computing platform.

6. The method of claim 1, further including:
   independently training each of the plurality of replicated instances; and
   combining the one or more of the plurality of replicated instances that are trained based on a weighted combination of parameters from the one or more of the plurality of replicated instances being combined.

7. A system for implementing mixed precision learning for neural networks, comprising:
   one or more computers with executable instructions that when executed cause the system to:
      replicate a neural network into a plurality of replicated instances, wherein each of the plurality of replicated instances differs in precision used for representing and determining parameters of the neural network;
      receive data instances as input;
      perform a data pre-processing operation on the data instances prior to routing the data instances to one or more of the plurality of replicated instances of the neural network, wherein the data pre-processing operation analyzes content of the data instances to determine a context of a type of deep learning problem associated with the content;
      determine, based on the data pre-processing operation, a required precision level to use to process each data instance, wherein the required precision level is a most optimal precision level at which the content of each data instance is most optimally processed with respect to a performance of the neural network;
      responsive to determining the required precision level, routing the data instances to the one or more of the plurality of replicated instances for processing according to the required precision level to use to process each data instance, wherein each data instance is routed to a particular replicated instance of the one or more of the plurality of replicated instances operating at the required precision level; and
      responsive to determining the particular replicated instance operating at the required precision level does not exist for a particular data instance of the data instances in that none of the plurality of replicated instances operates at the most optimal precision level for processing the content of the particular data instance, route the particular data instance to one of the one or more of the plurality of replicated instances operating at a higher precision level than the required precision level.

8. The system of claim 7, wherein the executable instructions further
   use one or more known metrics or a trained neural network to determine the required precision level comprising the most optimal precision level during the data pre-processing operation.

9. The system of claim 7, wherein the executable instructions further select the data instances for routing to the one or more of the plurality of replicated instances according to the required precision level, a dynamic load, or combination thereof.

10. The system of claim 7, wherein the executable instructions further batch the data instances according to a homogeneous precision levels or heterogeneous precision levels.

11. The system of claim 7, wherein the executable instructions further determine a number of the plurality of replicated instances based on precision levels and numerical formats supported by a computing platform.

12. The system of claim 7, wherein the executable instructions further:
   independently train each of the plurality of replicated instances; and combine the one or more of the plurality of replicated instances that are trained based on a weighted combination of parameters from the one or more of the plurality of replicated instances being combined.

13. A computer program product for implementing mixed precision learning for neural networks by a processor, the computer program product comprising a non- transitory computer-readable storage medium having computer-readable program code portions stored therein, the computer-readable program code portions comprising:

an executable portion that replicates a neural network into a plurality of replicated instances, wherein each of the plurality of replicated instances differs in precision used for representing and determining parameters of the neural network;

an executable portion that receives data instances as input;

an executable portion that performs a data pre-processing operation on the data instances prior to routing the data instances to one or more of the plurality of replicated instances of the neural network, wherein the data pre-processing operation analyzes content of the data instances to determine a context of a type of deep learning problem associated with the content;

an executable portion that determines, based on the data pre-processing operation, a required precision level to use to process each data instance, wherein the required precision level is a most optimal precision level at which the content of each data instance is most optimally processed with respect to a performance of the neural network;

an executable portion that, responsive to determining the required precision level, routes the data instances to the one or more of the plurality of replicated instances for processing according to the required precision level to use to process each data instance, wherein each data instance is routed to a particular replicated instance of the one or more of the plurality of replicated instances operating at the required precision level; and an executable portion that, responsive to determining the particular replicated instance operating at the required precision level does not exist for a particular data instance of the data instances in that none of the plurality of replicated instances operates at the most optimal precision level for processing the content of the particular data instance, routes the particular data instance to one of the one or more of the plurality of replicated instances operating at a higher precision level than the required precision level.

14. The computer program product of claim 13, further including an executable portion that
uses one or more known metrics or a trained neural network to determine the required precision level comprising the most optimal precision level during the data pre-processing operation.

15. The computer program product of claim 13, further including an executable portion that selects the data instances for routing to the one or more of the plurality of replicated instances according to the required precision level, a dynamic load, or combination thereof.

16. The computer program product of claim 13, further including an executable portion that batches the data instances according to a homogeneous precision levels or heterogeneous precision levels.

17. The computer program product of claim 13, further including an executable portion that determines a number of the plurality of replicated instances based on precision levels and numerical formats supported by a computing platform.

18. The computer program product of claim 13, further including an executable portion that:
independently trains each of the plurality of replicated instances; and
combines the one or more of the plurality of replicated instances that are trained based on a weighted combination of parameters from the one or more of the plurality of replicated instances being combined.

* * * * *